United States Patent

Yoshimura

[11] Patent Number: 5,095,691
[45] Date of Patent: Mar. 17, 1992

[54] SECONDARY AIR SUPPLY SYSTEM FOR AN INTERNAL COMBUSTION ENGINE

[75] Inventor: Kunimasa Yoshimura, Toyota, Japan

[73] Assignee: Toyota Jidosha Kabushiki Kaisha, Aichi, Japan

[21] Appl. No.: 618,666

[22] Filed: Nov. 27, 1990

[30] Foreign Application Priority Data

Nov. 30, 1989 [JP] Japan .................. 1-138080[U]

[51] Int. Cl.$^5$ .......................... F01N 3/32; F01P 7/10
[52] U.S. Cl. .................................. 60/289; 60/307; 123/41.49
[58] Field of Search ............... 60/289, 290, 307, 274; 123/41.49

[56] References Cited

U.S. PATENT DOCUMENTS

| | | | |
|---|---|---|---|
| 3,771,921 | 11/1973 | Rohde | 60/307 |
| 4,709,666 | 12/1987 | Merz | 123/41.49 |
| 4,794,883 | 1/1989 | Fukami | 123/41.12 |
| 4,798,050 | 1/1989 | Nakamura | 60/329 |

FOREIGN PATENT DOCUMENTS 48-56405 5/1973 Japan .
52-53217 4/1977 Japan .
60-4170 5/1985 Japan .
62-87124 6/1987 Japan .

*Primary Examiner*—Douglas Hart
*Attorney, Agent, or Firm*—Kenyon & Kenyon

[57] ABSTRACT

A secondary air supply system for an internal combustion engine includes a first hydraulic passage including a first hydraulic motor for an engine cooling fan. The system further includes a second hydraulic passage including a second hydraulic motor for a secondary air supply pump. At a connecting point of the first hydraulic passage and the second hydraulic passage, a hydraulic passage switching valve is installed. The hydraulic passage switching valve causes oil to flow through the second hydraulic passage to drive the air pump for a few minutes after engine start and then switches to cause the oil to flow through the first hydraulic passage to drive the engine cooling fan. In this way, the secondary air supply pump is driven not by a pulley-belt assembly but by a hydraulic system, and a single hydraulic pump can be used for driving both the engine cooling fan and the secondary air supply pump.

11 Claims, 4 Drawing Sheets

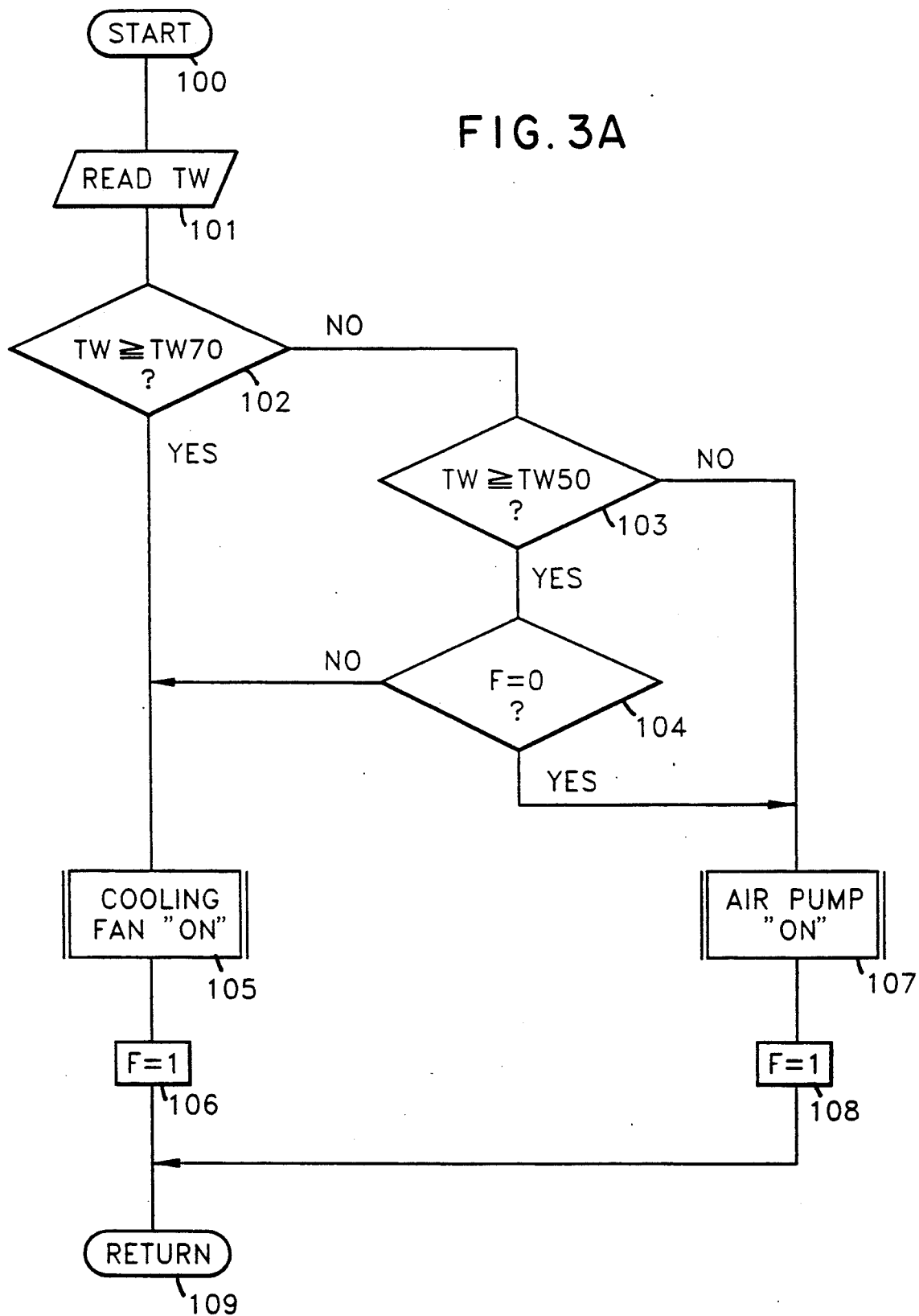

SECONDARY AIR SUPPLY SYSTEM FOR AN INTERNAL COMBUSTION ENGINE

BACKGROUND OF THE INVENTION

1. Field of the Invention

The present invention relates to a secondary air supply system for an internal combustion engine.

2. Description of the Prior Art

To purify hydrocarbons and carbon monoxide included in the exhaust gas from an internal combustion engine, so called secondary air is injected into an exhaust manifold or exhaust pipe of the engine. An air pump for pumping the secondary air is usually arranged in front of the engine and is driven by a pulley-belt assembly. More particularly, a pulley is coupled to the air pump and a crankshaft pulley is coupled to a crankshaft of the engine. A belt is wound around the pulleys and transmits rotation of the engine crankshaft to the air pump.

However, in such a pump driven by a pulley-belt assembly, it is often difficult to install an air pump and its pulley in front of the engine in the case of an engine also equipped with with a power steering device, an air conditioner, and a supercharger, because various pulleys for driving such elements are crowded in the same space.

Further, for an air pump driven by a pulley-belt assembly, a belt layout is required to be changed from a belt layout for an engine without air pump, and an auto-tensioner often needs to be provided for preventing the belt from slipping. The layout change and the addition of the tensioner greatly increase the cost.

SUMMARY OF THE INVENTION

An object of the invention is to provide a secondary air supply system for an internal combustion engine wherein an air pump is driven by means other than a pulley-belt assembly to provide greater freedom in mounting the air pump in a vehicle.

Another object of the invention is to provide a secondary air supply system for an internal combustion engine wherein a system for driving other auxiliary equipment is partially used in common for driving an air pump for secondary air supply to avoid a cost increase without causing any problem in the driving of the other auxiliary equipment.

In accordance with the present invention, the above-described object of the invention is attained by a secondary air supply system for an internal combustion engine that includes a single hydraulic pump having an inlet connected to an oil pan of the engine and an outlet, a hydraulic passage switching valve having an inlet connected to the outlet of the hydraulic pump and first and second outlets, a first hydraulic passage having an input end connected to the first outlet of the switching valve and an output end returning to the engine oil pan, a first hydraulic motor coupled to an engine cooling fan and installed in the first hydraulic passage, a second hydraulic passage having an input end connected to the second outlet of the switching valve and an output end returning to the engine oil pan, and a second hydraulic motor installed in the second hydraulic passage and coupled to an air pump for supplying secondary air into an exhaust manifold of an internal combustion engine.

In the above-described secondary air supply system, since the air pump is driven not by a pulley-belt assembly but by a hydraulic system, the air pump can be arranged independently of the position of the crankshaft pulley, and the freedom of arrangement of the air pump is increased.

Further, since the hydraulic pump for driving the first hydraulic motor for the engine cooling fan is also used for driving the second hydraulic motor for the secondary air supply air pump, the cost increase in providing the hydraulic system for driving the air pump is minimized.

Furthermore, no problem arises from the common use of a single hydraulic pump to supply the first and second motors of the hydraulic system, because secondary air for use in the exhaust gas purification is required only for a few minutes after engine start, and after that time the secondary air is not needed. During this few minutes after the engine start, the engine cooling fan does not need to be driven, because the engine cooling water is still cold. Therefore, the oil pumped by the hydraulic pump is delivered to the second hydraulic passage to drive the air pump during the few minutes after engine start and is switched to the first hydraulic passage to drive the engine cooling fan after the few minutes are up.

BRIEF DESCRIPTION OF THE DRAWINGS

The above and other objects, features and advantages of the present invention will become more apparent and will be more readily appreciated from the following detailed description of the preferred exemplary embodiments of the invention taken in conjunction with the accompanying drawings, in which:

FIG. 3A is a flow chart for controlling operation of the system in accordance with the first embodiment of the present invention.

DETAILED DESCRIPTION OF THE PREFERRED EMBODIMENTS

Figure 1:
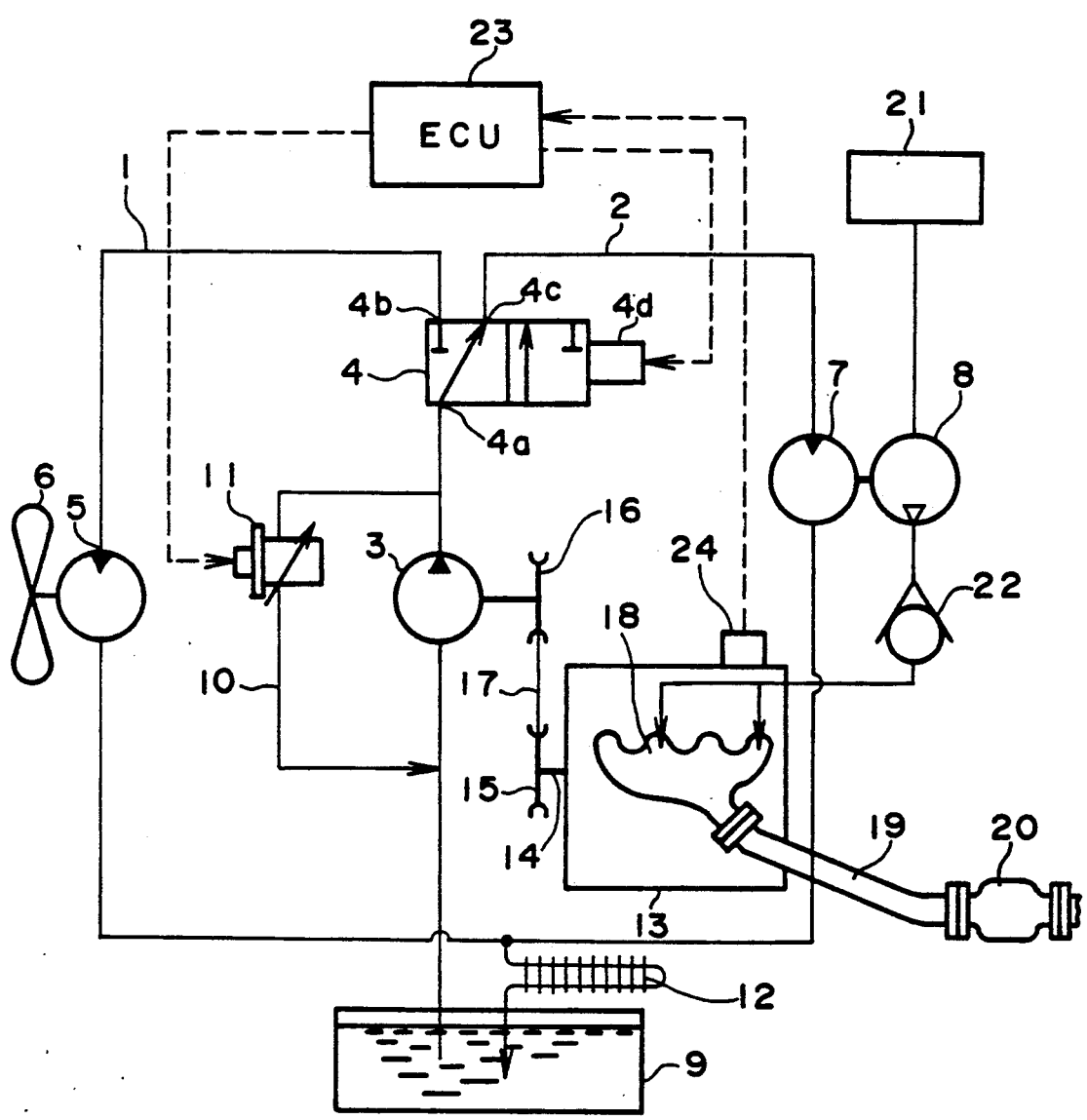
FIG. 1 is a system diagram of a secondary air supply system for an internal combustion engine in accordance with the present invention.

As illustrated in FIG. 1, a secondary air supply system for an internal combustion engine 13 in accordance with the present invention includes a first hydraulic passage 1 and a second hydraulic passage 2. A single hydraulic pump 3 has an inlet connected to an oil pan 9 and an outlet connected to an inlet port 4a of a hydraulic passage switching valve 4. The first hydraulic passage 1 has an input end connected to a first outlet port 4b of the switching valve 4 and an output end that returns to the oil pan 9. A first hydraulic motor 5 coupled to an engine cooling fan 6 is installed in the first hydraulic passage 1. The second hydraulic passage 2 has an input end connected to a second outlet port 4c of the hydraulic passage switching valve 4 and an output end that returns to the engine oil pan 9. A second hydraulic motor 7 coupled to an air pump 8 for supplying secondary air into an exhaust manifold 18 or an exhaust pipe 19 of the engine 13 is installed in the second hydraulic passage 2.

A pressure relief passage 10 is provided so as to connect the outlet of the hydraulic pump 3 and the inlet of the hydraulic pump 3. A pressure relief valve 11 allowing flow only in the direction from the outlet to the inlet of the hydraulic pump is installed in the pressure relief passage 10.

The outlet end of the first hydraulic passage 1 downstream of the first hydraulic motor 5 joins the outlet of the second hydraulic passage 2 downstream of the second hydraulic motor 7 at a joining point to define a common passage downstream of the joining point. An oil cooler 12 is installed in the common passage.

The hydraulic pump 3 pumps oil from the engine oil pan 9 toward the hydraulic passage switching valve 4. When the pressure at the outlet of the hydraulic pump exceeds a predetermined pressure, the pressure relief valve 11 relieves the pressure by returning one portion of the oil to the engine oil pan 9 through the pressure relief passage 10.

The hydraulic pump 3 is driven by an engine crankshaft 14 via belt means 17, for example, a V-belt. More particularly, a crankshaft pulley 15 is coupled to the engine crankshaft 14 and another pulley 16 is coupled to a rotational shaft of the hydraulic pump 3. The belt 17 is wound around the pulleys 15 and 16 to transmit rotation of the crankshaft 14 to the hydraulic pump 3. The single hydraulic pump 3 is used for driving both the first hydraulic motor 5 and the second hydraulic motor 7.

The hydraulic passage switching valve 4 includes a solenoid 4d for switching connection of the inlet port 4a between the first outlet port 4b and the second outlet port 4c. A rotational shaft of the first hydraulic motor 5 is coupled to the engine cooling fan 6, and a rotational shaft of the second hydraulic motor 7 is coupled to the air pump 8. When the inlet port 4a and the first outlet port 4b communicate with each other, all of the oil pumped by the hydraulic pump 3 flows to the first hydraulic motor 5 to drive the engine cooling fan 6, and the air pump 8 stops. In contrast, when the inlet port 4a and the second outlet port 4c communicate with each other, all of the oil pumped by the hydraulic pump 3 flows to the second hydraulic motor 7 to drive the air pump 8, and the engine cooling fan 6 stops.

The air pump 8 driven by the second hydraulic motor 7 pumps secondary air from an air cleaner 21 via a one-way valve 22 to the exhaust manifold 18 or the exhaust pipe 19 of the engine 13. A catalytic converter 20 is installed in the exhaust pipe 19. The secondary air injected into the exhaust gas helps hydrocarbons and carbon monoxide included in the exhaust gas to be oxidized and converted to carbon dioxide and water in the catalytic converter 20.

The solenoid 4d of the hydraulic passage switching valve 4 and the pressure relief valve 11 are electrically connected to an electric control unit 23 (hereinafter, ECU) 11 so that their operations are controlled by the ECU 23. The ECU 23 is constituted by a micro computer. An engine cooling water detecting sensor 24 is provided for the engine 13, and the signal from the sensor 24 is fed to the ECU 23.

The ECU 23 includes (not shown) an input/output interface, an analog/digital converter, a read-only memory, a random access memory, and a central processor unit like a usual micro computer. A program as shown in FIG. 3A or FIG. 3B is stored in the read-only memory, and the central processor unit calls out the program and executes the calculation.

Figure 2A:
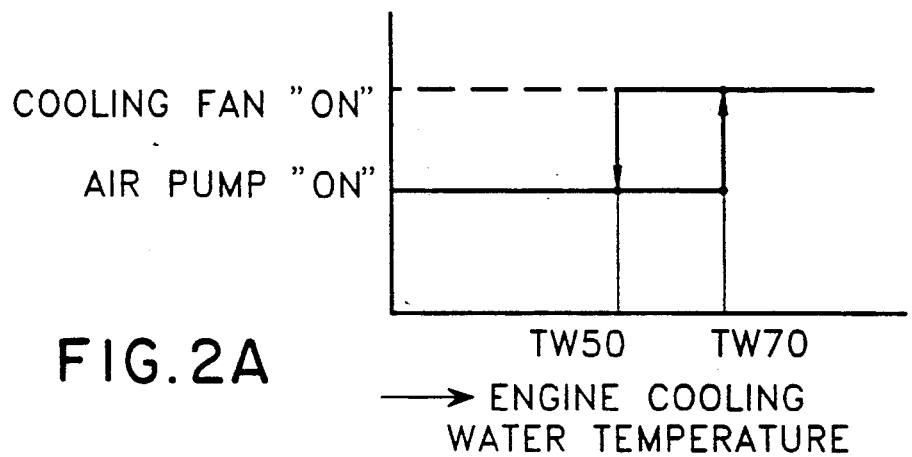
FIG. 2A is a chart illustrating a relationship between engine cooling water temperature and cooling fan operation in accordance with a first embodiment of the present invention.
Figure 3B:
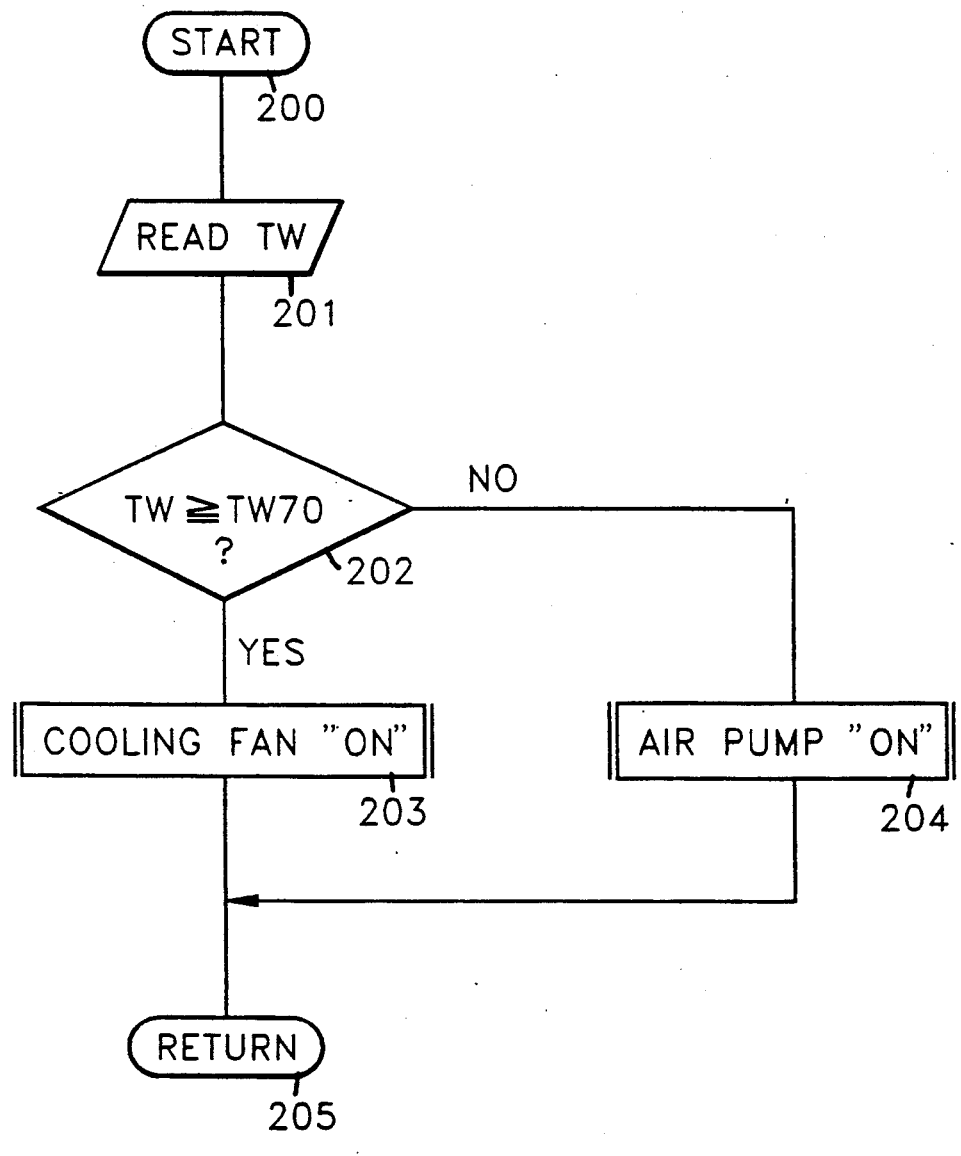
FIG. 3B is a flow chart for controlling operation of the system in accordance with the second embodiment of the present invention.

FIGS. 2A and 3B illustrate a switching control in accordance with a first embodiment of the present invention. In FIG. 3A, the routine is entered at a step 100 at periodic short time intervals. Then, at a step 101, an engine cooling water temperature TW is read as a signal from the sensor 24. At a step 102, whether or not the detected engine cooling water temperature TW is equal to or higher than a first predetermined temperature TW70, for example 70° C., is determined. When TW is equal to or higher than TW70, the routine proceeds to a step 105, where the solenoid 4d is operated so as to connect the inlet port 4a with the first outlet port 4b to drive the engine cooling fan 6 and to stop the air pump 8. Then, at a step 106, a flag F is changed to "1". In contrast, when TW is lower than TW70 at the step 102, the routine proceeds to a step 103, where whether or not TW is higher than a second predetermined temperature which is lower than the first predetermined temperature, for example 50° C., is determined. When TW is lower than TW50 at step 103, the routine proceeds to a step 107, where the solenoid 4d is operated so as to connect the inlet port 4a with the second outlet port 4c to drive the air pump 8 and to stop the engine cooling fan 6. Then, at a step 108, the flag F is changed to "0". When TW is equal to or higher than TW50 at the step 103, the routine proceeds to a step 104. At step 104, when the flag F is equal to "0", the routine proceeds to the step 107, and when the flag F is equal to "1", the routine proceeds to the step 105. Due to the provision of the steps 103 and 104, the valve switching characteristic follows a hysteresis loop as shown in FIG. 2A so that hunting of the valve 4 is prevented.

As will be apparent from FIGS. 2A and 3A, in the first embodiment, the hydraulic passage switching valve 4 is adapted to connect the inlet port 4a with the second outlet port 4c when the engine cooling water temperature TW is rising but is lower than the first predetermined temperature TW70 and when the engine cooling water temperature TW then falls below the second predetermined temperature TW50, and to connect the inlet port 4a with the first outlet port 4b when the engine cooling water temperature TW rises to be equal to or higher than the first predetermined temperature TW70 and when the engine cooling water temperature TW then falls but still is equal to or higher than the second predetermined temperature TW50.

Figure 2B:
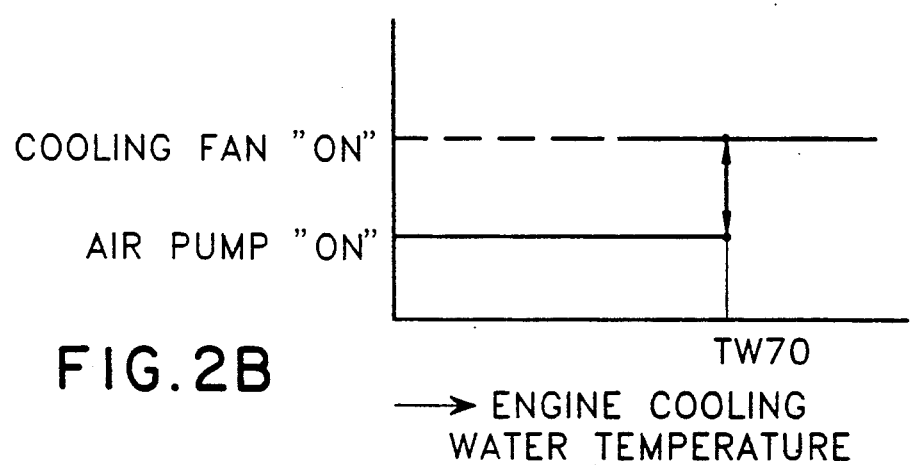
FIG. 2B is a chart illustrating a relationship between engine cooling water temperature and cooling fan operation in accordance with a second embodiment of the present invention.

FIGS. 2B and 3B illustrate a second embodiment of the present invention. In FIG. 3B, the routine is entered at a step 200. Then, at a step 201, an engine cooling water temperature TW is read as a signal from the sensor 24. Then, at a step 202, whether or not TW is higher than a predetermined temperature TW70, for example 70° C., is determined. When TW is equal to or higher than TW70, the routine proceeds to a step 203, where the hydraulic passage switching valve 4 is operated so as to connect the inlet port 4a with the first outlet port 4b to drive the engine cooling fan 6 and to stop the air pump 8. In contrast, when TW is lower than TW70 at the step 202, the routine proceeds to a step 204, where the hydraulic passage switching valve 4 is operated so as to connect the inlet port 4a with the second outlet port 4c to drive the air pump 8 and to stop the engine cooling fan 6. The routine proceeds to a step 205 to retune to another routine. As will be apparent from FIGS. 2B and 3B, the hydraulic passage switching valve 4 is adapted to connect the inlet port 4a with the second outlet port 4c when the engine cooling water temperature TW is lower than the predetermined temperature TW70 and to connect the inlet port 4a with the first outlet port 4b when the engine cooling water temperature TW is equal to or higher than the predetermined temperature TW70.

Figure 2C:
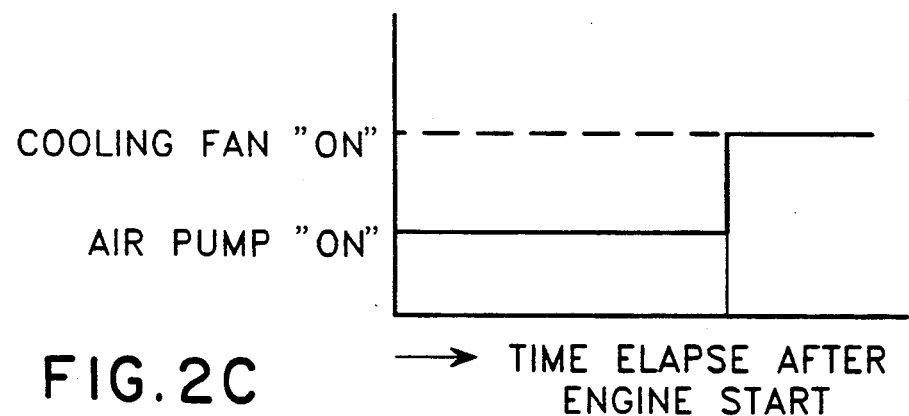
FIG. 2C is a chart illustrating a relationship between time elapsed after engine start and cooling fan operation in accordance with a third embodiment of the present invention.

FIG. 2C illustrates a third embodiment of the present invention. As illustrated in FIG. 2C, the hydraulic passage switching valve 4 is adapted to connect the inlet port 4a with the second outlet port 4c before a predetermined period of time has elapsed from engine start and to connect the inlet port 4a with the first outlet port 4b when and after the predetermined period of time has elapsed.

The operation of the system according to the present invention will now be explained.

In the above-described secondary air supply system, the air pump 28 is driven not by a pulley-belt assembly but by a hydraulic system including the hydraulic pump 3, the hydraulic passage switching valve 4, and the second hydraulic motor 7. In this instance, the hydraulic pump 3 for driving the first hydraulic motor 5 for the engine cooling fan 6 is used also as a pump for driving the second hydraulic motor 7 for the secondary air supply air pump 8.

Secondary air for use in the exhaust gas purification is required only for a few minutes after engine start, and after the few minutes the secondary air is not needed. On the other hand, in the few minutes from engine start, the engine cooling fan 6 does not need to be driven, because the engine cooling water is still cold. Therefore, the oil pumped by the hydraulic pump 3 is directed to the second hydraulic passage 2 to drive the air pump 8 during the few minutes after engine start and is switched to flow to the first hydraulic passage 1 to drive the engine cooling fan 6 after the few minutes.

In accordance with the present invention, the following advantages can be obtained.

First, since the air pump 8 is driven not by a pulley-belt assembly but by a hydraulic system, the air pump 8 can be arranged independently of the position of the crankshaft pulley. Therefore, the freedom of arrangement of the air pump 8 is increased.

Second, since the hydraulic pump 3 for driving the first hydraulic motor 5 for the engine cooling fan 6 is used also for driving the second hydraulic motor 7 for the secondary air supply air pump 8, the cost increase in providing the hydraulic system for driving the air pump 8 is minimized.

Third, since the hydraulic pump 3 is used for the air pump operation during a few minutes after engine start and for the engine cooling fan operation after the few minutes is up, interference between the air pump operation and the engine cooling fan operation does not occur. This enables the above-described use of the single hydraulic pump 3 for both purposes and decrease in cost due to the common use.

Although only a few embodiments of the present invention have been described in detail, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A secondary air supply system for an internal combustion engine comprising:
   a single hydraulic pump having an inlet connected to an oil source and an outlet;
   a hydraulic pressure switching valve having an inlet port connected to the outlet of the hydraulic pump and first and second outlet ports;
   a first hydraulic passage having an input end connected to the first outlet port of the switching valve and an output end returning to the oil source;
   a first hydraulic motor coupled to an engine cooling fan and installed in the first hydraulic passage;
   a second hydraulic passage having an input end connected to the second outlet port of the hydraulic passage switching valve and an output end returning to the oil source; and
   a second hydraulic motor for driving an air pump for supplying secondary air into an exhaust manifold of the internal combustion engine, the second hydraulic motor being installed in the second hydraulic passage.

2. The secondary air supply system according to claim 1, and further comprising a pressure relief passage connecting the outlet of the hydraulic pump and the inlet of the hydraulic pump and a pressure relief valve installed in the pressure relief passage.

3. The secondary air supply system according to claim 1, wherein the hydraulic pump is coupled to an engine crankshaft via a belt so that the hydraulic pump is driven by the engine crankshaft.

4. The secondary air supply system according to claim 3, wherein a first pulley is coupled to the engine crankshaft and a second pulley is coupled to the hydraulic pump, the belt being wound around the first pulley and the second pulley.

5. The secondary air supply system according to claim 1, and further comprising an oil cooler and wherein the output end of the first hydraulic passage downstream of the first hydraulic motor and the output end of the second hydraulic passage downstream of the second hydraulic motor join each other at a joining point to define a common passage downstream of the joining point, the oil cooler being installed in the common passage.

6. The secondary air supply system according to claim 1, wherein the hydraulic passage switching valve includes a solenoid for switching connection of the inlet port between the first outlet port and the second outlet port.

7. The secondary air supply system according to claim 6, further comprising means for actuating the solenoid of the hydraulic passage switching valve to connect the inlet port with the second outlet port when an engine cooling water temperature is rising but is lower than a first predetermined temperature and when the engine cooling water temperature falls below a second predetermined temperature lower than the first predetermined temperature, and to connect the inlet port with the first outlet port when the engine cooling water temperature rises to be equal to or higher than the first predetermined temperature and to remain connected to the first inlet port as long as the engine cooling water temperature is equal to or higher than the second predetermined temperature.

8. The secondary air supply system according to claim 7, wherein the first predetermined temperature is about 70° C. and the second predetermined temperature is about 50° C.

9. The secondary air supply system according to claim 6, further comprising means for actuating the solenoid of the hydraulic passage switching valve to connect the inlet port with the second outlet port when an engine cooling water temperature is lower than a predetermined temperature and to connect the inlet port with the first outlet port when the engine cooling water temperature is equal to or higher than the predetermined temperature.

10. The secondary air supply system according to claim 9, wherein the predetermined temperature is about 70° C.

11. The secondary air supply system according to claim 6, further comprising means for actuating the solenoid of the hydraulic passage switching valve to connect the inlet port with the second outlet port before a predetermined period of time has elapsed from engine start and to connect the inlet port with the first outlet port when and after the predetermined period of time has elapsed from engine start.

* * * * *